United States Patent
de Jong

(10) Patent No.: US 11,609,395 B2
(45) Date of Patent: Mar. 21, 2023

(54) WAVEGUIDE SUBSTRATES AND ASSEMBLIES INCLUDING THE SAME

(71) Applicant: CORNING RESEARCH & DEVELOPMENT CORPORATION, Corning, NY (US)

(72) Inventor: Michael de Jong, Colleyville, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/571,580

(22) Filed: Jan. 10, 2022

(65) Prior Publication Data
US 2022/0221669 A1    Jul. 14, 2022

Related U.S. Application Data

(60) Provisional application No. 63/185,507, filed on May 7, 2021, provisional application No. 63/135,823, filed on Jan. 11, 2021.

(51) Int. Cl.
*H04B 10/00*    (2013.01)
*G02B 6/42*    (2006.01)

(52) U.S. Cl.
CPC ......... *G02B 6/4284* (2013.01); *G02B 6/4256* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,155,785 A | * | 10/1992 | Holland | G02B 6/3608 156/158 |
| 5,343,544 A | | 8/1994 | Boyd et al. | |
| 5,367,594 A | * | 11/1994 | Essert | G02B 6/3806 385/70 |

(Continued)

FOREIGN PATENT DOCUMENTS

| CN | 1381736 A | 11/2002 |
|---|---|---|
| CN | 101576711 A | 11/2009 |

(Continued)

OTHER PUBLICATIONS

CommScope, "Fiber Indexing", available online at <https://web.archive.org/web/20170903124659if_/http://www.commscope.com/Solutions/Fiber-Indexing/>, 2017, 3 pages.

(Continued)

*Primary Examiner* — Agustin Bello
(74) *Attorney, Agent, or Firm* — Adam R. Weeks

(57) ABSTRACT

A waveguide substrate configured includes a first surface, a second surface opposite the first surface, and a communication side having at least one projecting boss that at least partially defines a bore for receiving a ferrule of an optical connector. Each projecting boss includes an outboard end from which the bore extends into the waveguide substrate, and an end of the bore within the waveguide substrate defines an optical interface surface. At least one waveguide within the waveguide substrate extends from the optical interface surface. A first slot is formed in each projecting boss between the associated bore and the first surface, with the first slot extending from the outboard end of the projecting boss and along a majority of the bore.

20 Claims, 5 Drawing Sheets

(56) References Cited

U.S. PATENT DOCUMENTS

| | | | | |
|---|---|---|---|---|
| 6,062,740 | A * | 5/2000 | Ohtsuka | G02B 6/3865 385/83 |
| 6,477,290 | B1 * | 11/2002 | Wan | G02B 6/3582 359/290 |
| 6,754,429 | B2 | 6/2004 | Borrelli et al. | |
| 6,850,671 | B2 | 2/2005 | Carnevale et al. | |
| 6,990,265 | B2 | 1/2006 | Kubby et al. | |
| 8,270,784 | B2 * | 9/2012 | Thomson | G02B 6/125 385/31 |
| 8,699,838 | B2 * | 4/2014 | Andrzejewski | G02B 6/12004 385/49 |
| 9,029,242 | B2 | 5/2015 | Holden et al. | |
| 9,223,094 | B2 * | 12/2015 | Schneider | G02B 6/3885 |
| 9,348,096 | B2 | 5/2016 | Kmit et al. | |
| 9,442,259 | B2 | 9/2016 | Furuya | |
| 9,753,229 | B2 * | 9/2017 | Murray | G02B 6/4471 |
| 9,829,667 | B2 * | 11/2017 | White | G02B 6/3612 |
| 9,846,283 | B2 * | 12/2017 | Pepe | G02B 6/30 |
| 10,459,160 | B2 * | 10/2019 | Brusberg | G02B 6/122 |
| 10,684,419 | B2 | 6/2020 | Fortusini et al. | |
| 10,955,633 | B2 * | 3/2021 | Schneider | G02B 6/4453 |
| 11,372,169 | B2 * | 6/2022 | Evans | G02B 6/3825 |
| 2004/0240812 | A1 * | 12/2004 | Sun | G02B 6/3612 385/128 |
| 2004/0258359 | A1 | 12/2004 | Corkum et al. | |
| 2010/0220957 | A1 * | 9/2010 | Asahi | G02B 6/4239 385/39 |
| 2012/0057836 | A1 * | 3/2012 | Andrzejewski | G02B 6/12004 385/135 |
| 2013/0094801 | A1 | 4/2013 | Morris | |
| 2014/0205241 | A1 * | 7/2014 | Nielson | G02B 6/3871 385/66 |
| 2014/0294339 | A1 | 10/2014 | Lagziel et al. | |
| 2015/0166396 | A1 | 6/2015 | Marjanovic et al. | |
| 2015/0261261 | A1 | 9/2015 | Bhagavatula et al. | |
| 2016/0025942 | A1 * | 1/2016 | Pepe | G02B 6/3893 385/24 |
| 2016/0199944 | A1 | 7/2016 | Hosseini | |
| 2017/0059781 | A1 * | 3/2017 | Fortusini | G02B 6/428 |
| 2017/0146751 | A1 | 5/2017 | Sutherland | |
| 2018/0156985 | A1 * | 6/2018 | Nielson | G02B 6/3825 |
| 2019/0302371 | A1 * | 10/2019 | Van Wuijckhuijse | G02B 6/3869 |
| 2020/0241220 | A1 | 7/2020 | Evans | |
| 2021/0018697 | A1 * | 1/2021 | Evans | G02B 6/406 |
| 2022/0128767 | A1 * | 4/2022 | Evans | G02B 6/3882 |
| 2022/0221669 | A1 * | 7/2022 | de Jong | G02B 6/30 |

FOREIGN PATENT DOCUMENTS

| | | |
|---|---|---|
| CN | 102958642 A | 3/2013 |
| CN | 102971838 A | 3/2013 |
| CN | 103018799 A | 4/2013 |
| CN | 105246850 A | 1/2016 |
| CN | 105618936 A | 6/2016 |
| EP | 1162484 A2 | 12/2001 |
| EP | 3077150 A1 | 10/2016 |
| JP | 04-284406 A | 10/1992 |
| JP | 09-311237 A | 12/1997 |
| JP | 2002-267852 A | 9/2002 |
| WO | 2009/001969 A2 | 12/2008 |
| WO | 2012/023430 A1 | 2/2012 |
| WO | 2014/165175 A1 | 10/2014 |
| WO | 2015/081436 A1 | 6/2015 |
| WO | 2016/137488 A1 | 9/2016 |
| WO | 2017/046190 A2 | 3/2017 |
| WO | 2019/195219 A1 | 10/2019 |

OTHER PUBLICATIONS

Corbari et al., "Femtosecond versus picosecond laser machining of nano-gratings and micro-channels in silica glass", Optics Express, vol. 21, No. 4, 2013, pp. 3946-3958.

Fernández-Pradas et al., "Laser fabricated microchannels inside photostructurable glass-ceramic", Applied Surface Science, vol. 255, No. 10, 2009, pp. 5499-5502.

International Search Report and Written Opinion of the International Searching Authority; PCT/US2019/025294; dated Jun. 25, 2019; 12 Pages; European Patent Office.

Karimelahi et al., "Rapid micromachining of high aspect ratio holes in fused silica glass by high repetition rate picosecond laser", Applied Physics A: Materials Science and Processing, vol. 114, 2013, pp. 91-111.

Optoscribe, "Fiber Coupled InterconneX (FCX™) for Photonic Integration", available online at <https://web.archive.org/web/20170509155220/http://www.optoscribe.com:80/products/fcx-fiber-coupled-interconnex/>, May 9, 2017, 2 pages.

* cited by examiner

WAVEGUIDE SUBSTRATES AND ASSEMBLIES INCLUDING THE SAME

PRIORITY APPLICATIONS

This application claims the benefit of priority of U.S. Provisional Application No. 63/135,823, filed on Jan. 11, 2021, and U.S. Provisional Application No. 63/185,507, filed on May 7, 2021, the content of which is relied upon and incorporated herein by reference in entirety.

BACKGROUND

The present disclosure generally relates to optical connections and, more particularly, to waveguide substrates, waveguide substrate connector assemblies, and methods of fabricating waveguide substrates for providing optical connections between optical fibers of optical connectors.

In optical communication networks, optical cables and equipment are used to route the optical signals to desired network locations. For example, some pieces of equipment may serve as junction points between different optical cables. At these junction points it is often necessary to breakout optical signals from one cable to smaller groups of the optical signals (or even individual optical signals), which may then be carried by a larger number of other cables for further distribution in the network. A common piece of fiber optic equipment that is used to breakout optical signals in this manner is known as a fiber optic module or cassette, an example of which is illustrated in FIG. 9 ("fiber optic module 10"). Such equipment includes a body 12 that supports adapters 16, 18 for interfacing with fiber optic connectors (not shown) of cables that extend to or from the module 10. One or more multifiber connectors (e.g., a multifiber push on/pull off (MPO) connector) may couple to adapter(s) 16 on one exterior side of the body 12 (e.g., a back side), and various simplex or duplex connectors (e.g., a simplex or duplex LC connector) may couple to corresponding adapters 18 on another exterior side of the body 12 (e.g., a front side). Optical fibers (not shown) extend within the body 12 between the adapters 16, 18 to achieve the desired breakout scheme or other optical signal routing. More specifically, within an interior of the body 12, a harness includes: (a) connectors that couple to sides/ports of the adapters 16, 18 that face the interior; and (b) optical fibers extending between those connectors.

As another example, some pieces of equipment may serve a junction point between one or more optical cables and opto-electrical components. This type of equipment often comprises a housing or enclosure having a faceplate or bulkhead that supports one or more adapters for interfacing with connector(s) that terminate the cable(s). Within the housing, optical fibers are often used to route optical signals from the adapter(s) to the opto-electrical components.

Although optical fibers are commonly used to route optical signals within bodies or housings, managing their connections and routing/placement can be challenging, especially when there is a drive to keep equipment as small as possible. One potential solution to address these challenges involves using a waveguide substrate to achieve the desired optical signal routing within a body or housing. The waveguide substrate may be a glass substrate with waveguides formed by a laser, ion-exchange processes, or other techniques. Several examples of such a waveguide substrate are disclosed in WO 2019/195219A ("the '219 publication"), entitled "WAVEGUIDE SUBSTRATES AND WAVEGUIDE SUBSTRATE CONNECTOR ASSEMBLIES HAVING WAVEGUIDES AND ALIGNMENT FEATURES AND METHODS OF FABRICATING THE SAME," the disclosure of which is fully incorporated herein by reference. Although the '219 publication discloses various different interfaces for a waveguide substrate to couple to (i.e., mate with) optical connectors, there remains a desire for further designs. The use of waveguide substrates as a substitute for optical fiber routing in network equipment is not widespread, and different designs may have different advantages to further promote the adoption of this technology.

SUMMARY

The present disclosure provides a waveguide substrate configured to interface with an optical connector that includes a ferrule extending from a connector body. The waveguide substrate comprises: a first surface and a second surface opposite the first surface; and a communication side defined between the first surface and the second surface. The communication side has at least one projecting boss that at least partially defines a bore for receiving the ferrule of the optical connector. Each projecting boss of the at least one projecting boss includes an outboard end from which the bore extends into the waveguide substrate, and an end of the bore within the waveguide substrate defines an optical interface surface. The waveguide substrate also comprises at least one waveguide within the waveguide substrate extending from the optical interface surface of the bore; and a first slot formed in each projecting boss of the at least one projecting boss. The first slot is formed between the bore of the projecting boss and the first surface, and extends from the outboard end of the projecting boss and along a majority of the bore.

In some embodiments, the waveguide substrate further comprises a second slot formed in each projecting boss of the at least one projecting boss. The second slot is formed between the bore of the projecting boss and the second surface, and extends from the outboard end of the projecting boss and along a majority of the bore.

In some embodiments, for each projecting boss of the at least one projecting boss, the communication side of the waveguide substrate further includes relief cavities adjacent the projecting boss for receiving a portion of the connector body. The first slot formed in each projecting boss may extend further into the waveguide substrate than the relief cavities.

Optical waveguide assemblies are also provided in this disclosure, such assemblies including an optical waveguide substrate (e.g., as described above) and at least one housing coupled to the communication side of the waveguide substrate. The communication side of the waveguide substrate includes relief cavities adjacent each projecting boss of the at least one projecting boss. Each housing comprises at least one connector cavity for receiving the optical connector. Each of the relief cavities in the communication side of the waveguide substrate and each projecting boss communicate with the at least one connector cavity.

Fiber optic assemblies are also provided in this disclosure. According to one embodiment, a fiber optic assembly comprises a body defining an interior and an optical wave assembly (e.g., as described in the preceding paragraph) positioned in the interior of the body. The fiber optic assembly may a fiber optic module/cassette in some embodiments.

Additional features and advantages will be set out in the detailed description below, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be clarified by examples in the description below. In general, the description relates to a waveguide substrate that interfaces with one or more optical connectors. The waveguide substrate is designed to route optical signals from the optical fiber(s) that are terminated by the optical connector(s). To this end, the waveguide substrate may be used in fiber optic equipment where optical signal routing takes place. For example, the waveguide substrate may be used in fiber optic modules/cassettes (e.g., the fiber optic module 10 of FIG. 9), transceiver modules, or the like.

Figure 1:
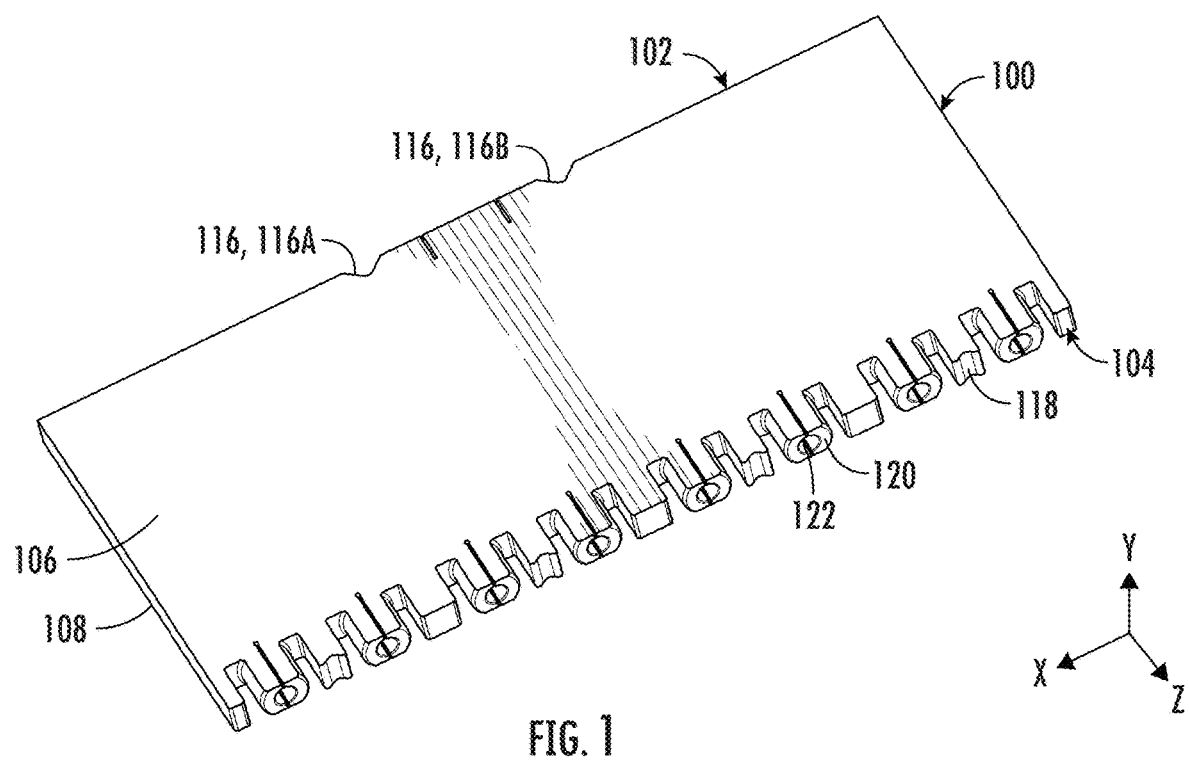
FIG. 1 is a perspective view of one example of a waveguide substrate according to this disclosure.
Figure 2:
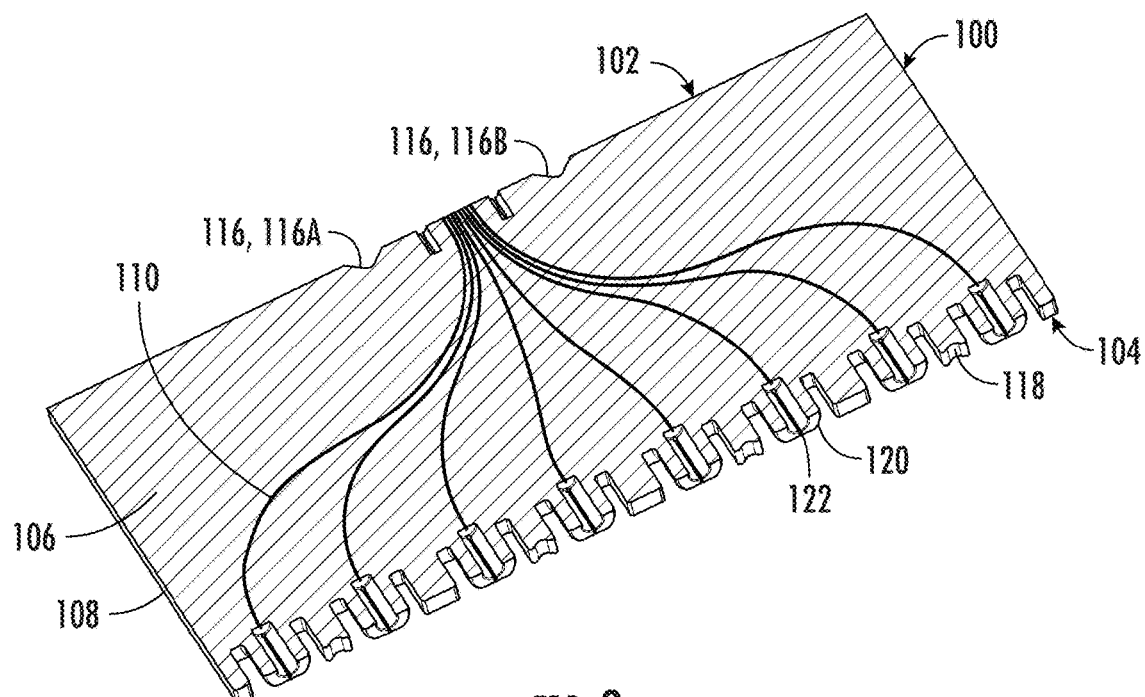
FIG. 2 is a cross-sectional perspective view of the waveguide substrate shown in FIG. 1.

Referring to FIGS. 1 and 2, a non-limiting example of a waveguide substrate 100 including a plurality of waveguides 110 is schematically depicted. The waveguide substrate 100 may be fabricated from any suitable material, such as glass, sapphire, or semiconductor materials such as silicon. The waveguide substrate 100 includes a top, a bottom, and various side edges, which will be referred to as "sides" for convenience. Two of the sides are labeled in FIGS. 1 and 2—a first side 102 and a second side 104. The top and bottom are defined by a first surface 106 and a second surface 108, respectively. The embodiment shown includes a break-out of waveguides 110 from a larger grouping of eight waveguides 110 at the first side 102 to smaller groupings (subsets) of two waveguides 110 at the second side 104. Any two adjacent waveguides 110 at the first side 102 have a pitch (i.e., lateral spacing) that is larger than a pitch of any two adjacent waveguides 110 at the second side 104.

In the embodiment shown, four subsets of the waveguides 110 are provided at the second side 104, with the two waveguides 110 of each subset having a particular pitch at the second side 104. This pitch differs than the pitch between the waveguides 110 of adjacent subsets at the second side 104 in the embodiment shown, but in alternative embodiments the pitch between all the waveguides 110 at the second side 104 may be uniform. The break-out of optical signals from a larger connection group to smaller connection groups or even to individual connections facilitates the routing of optical signals toward different locations in the optical network. In alternative embodiments, there may be a different number of waveguides 110 in the larger connection group and/or smaller connection groups, such as 4, 8, 12, 24, 36, 48, etc. waveguides 110 at the first side 102 breaking out into a plurality of smaller subsets of 2, 4, 8, 12, etc. at the second side 104.

The first side 102 may be considered an input side because of its association with the larger connection group, and the second side 104 may be considered an output side. The references to "input" and "output" are therefore related to breaking out the larger connection group and not necessarily optical signal direction, as there may be two-way optical traffic between the first side 102 and the second side 104 using the waveguides 110. More generically, the first side 102 and the second side 104 may each be referred to as a "communication side" of the waveguide substrate 100 because optical signals enter and/or exit the waveguides 110 on these sides.

Each waveguide 110 is defined by a line on or channel within the waveguide substrate 100 having a refractive index that is different from the material outside of the waveguide 110 such that light is maintained within the waveguide 110 when propagating through the waveguide substrate 100. Any known or yet-to-be-developed methods of forming waveguides 110 in the waveguide substrate 100 may be used. For example, an ion-exchange process may be used to write the waveguides 110 by using a mask to change the refractive index of the material along paths defining the desired waveguides. As another example, a laser may be used to create two-dimensional or three-dimensional waveguides within bulk material of the waveguide substrate 100.

In the illustrated example, ends of the waveguides 110 are relatively closely spaced (i.e., have a small pitch) at the first side 102, and spread out to be relatively largely spaced (i.e., have a large pitch) at the second side 104. As a non-limiting example, and described in detail below, the first side 102 may be configured to interface with a multifiber push-on/pull-off (MPO) connector (e.g., according to standard IEC 61754-7-2: 2019 or TIA/EIA 604-5-F: 2019), while the second side 104 may be configured to interface with LC connectors (e.g., simplex or duplex connectors according to intermatability standard IEC 61754-20-2: 2012 or TIA/EIA 604-10-B: 2008).

As shown in FIG. 1, the first side 102 of the waveguide substrate 100 may include one or more alignment features 116, such as a first alignment feature 116A and a second alignment feature 116B disposed on opposite sides of the waveguides 110. The first alignment feature 116A and the second alignment feature 116B are configured as vertical notches within an edge that defines the first side 102. As a non-limiting example, the notches may be configured as v-grooves. The vertical notches extend between the first surface 106 and the second surface 108 of the waveguide substrate 100. As used herein, "vertical" means along the illustrated y-axis (i.e., between and orthogonal to the first surface 106 and the second surface 108). The alignment features 116 are configured to provide alignment of a housing (not shown in FIGS. 1 and 2) that can be assembled on the first side 102. The housing, in turn, can be used to couple an optical connector to the waveguide substrate 100 so that optical fibers terminated by the optical connector can be aligned with the waveguides 110 at the first side 102. These aspects are generally discussed WO 2019/195219A ("the '219 publication"), whose disclosure is incorporated herein by reference.

The second side 104 also includes a plurality of alignment features 118 configured to provide alignment of one or more housings (also not shown in FIGS. 1 and 2) that can be assembled on the second side 104. The housing(s), in turn, can be used to couple optical connectors (e.g., simplex or duplex optical connectors) to the waveguide substrate 100 so that optical fibers terminated by the optical connectors can be aligned with the waveguides 110 at the second side 104. Again, reference can made to the '219 publication for a general understanding of these principles. The '219 publication discloses various different embodiments of alignment features, including the alignment features 118 also being configured as notches. These features need not be discussed in detail in the present disclosure even though they may be included in various embodiments.

The present disclosure instead introduces new configurations of the waveguide substrate 100 for connectivity/mating purposes. Specifically, the present disclosure introduces new, advantageous configurations for coupling with an optical connector that includes one or more ferrules extending from a connector body. For example, the embodiment shown in FIGS. 1 and 2 includes a different configuration for the waveguide substrate 100 on the second side 104 than what is disclosed or suggested in the '219 publication. In the waveguide substrate 100, the second side 104 includes a plurality of projecting bosses 120, with each projecting boss 120 partially defining a respective bore 122.

Figure 3:
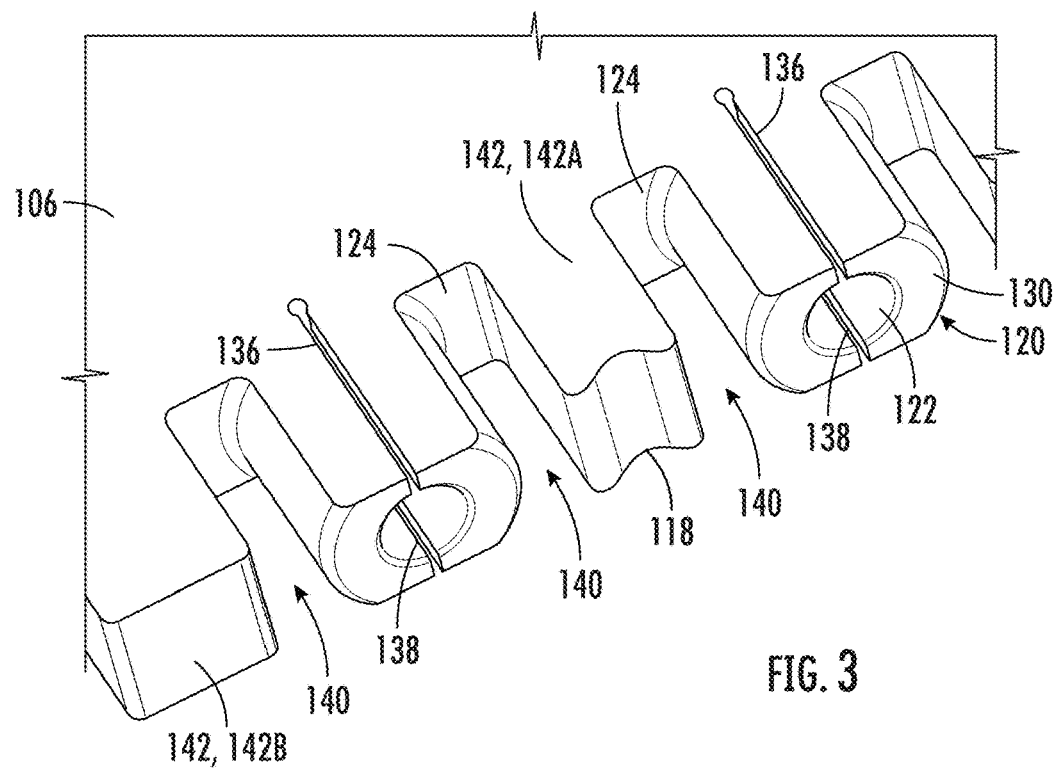
FIG. 3 is a close-up perspective view of a portion of the waveguide substrate shown in FIG. 1.
Figure 4:
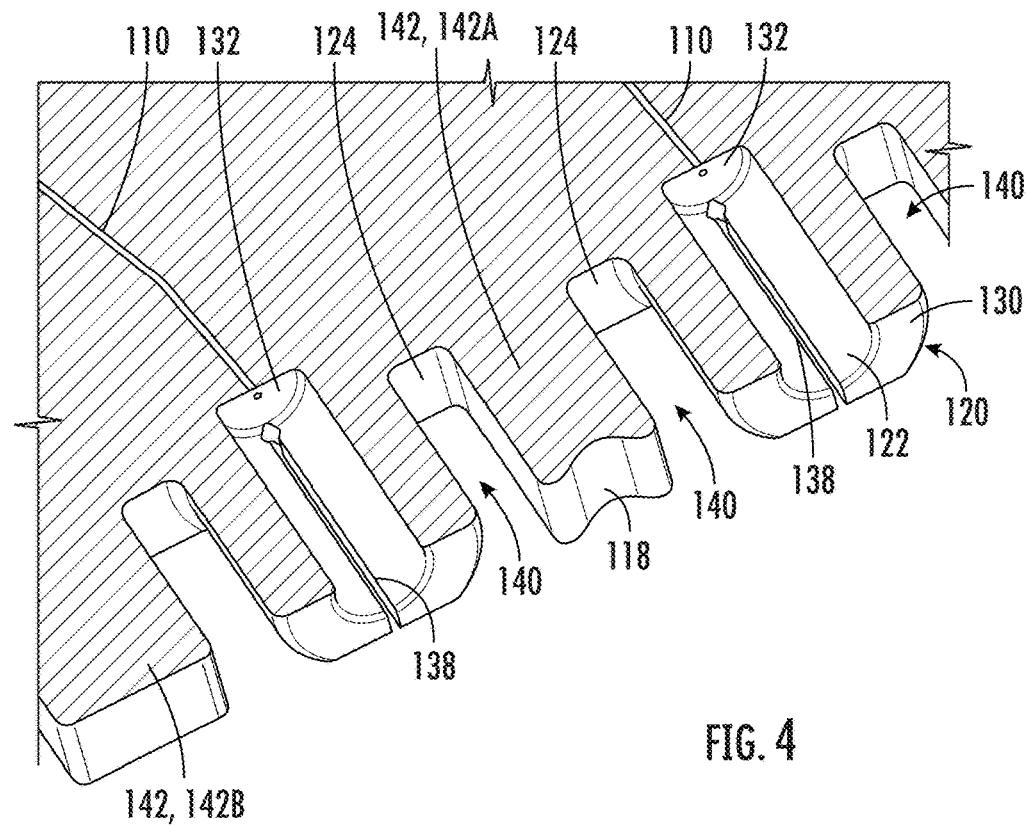
FIG. 4 is a close-up perspective view similar to FIG. 3, but illustrates the portion of the waveguide substrate in cross-section like FIG. 2.

FIGS. 3 and 4 are close-up views of portions of FIGS. 1 and 2, illustrating two of the projecting bosses 120 and associated bores 122 in further detail. Each projecting boss 120 extends outward from a forward-facing surface 124 of the second side 104 and includes an outboard end 130 where the projecting boss 120 terminates. The projecting bosses 120 in the embodiment shown each have a round, cylindrical shape that is truncated at planes corresponding to the first surface 106 and the second surface 108. Other embodiments may have different cylindrical-like or prismatic shapes, with the understanding that the term "cylindrical" is used in a broad sense to refer to any two-dimensional shape extended in a third dimension.

Each bore 122 extends into the waveguide substrate 100 from the outboard end 130 of the corresponding projecting boss 120. The bores 122 are effectively "blind" bores, terminating within the waveguide substrate 100 at respective optical interface surfaces 132. Thus, the optical interface surfaces 132 can be considered as bottom or end surfaces of the bores 122. The waveguides 110 of the waveguide substrate 100 extend from the optical interface surfaces 132.

The bores 122 may be formed using a laser damage-and-etch process. For example, a pulsed laser beam may be used to modify material of the waveguide substrate 100 where the bores 122 are desired. Etching solution may then be applied to etch away the modified/damaged material to form the bores 122. To facilitate such etching, the waveguide substrate 100 in the embodiment shown includes a first slot 136 and a second slot 138 formed in each projecting boss 120. Each first slot 136 is formed between the bore 122 of the projecting boss 120 and the first surface 106. Each first slot 136 also extends from the outboard end 130 of the projecting boss 120 and along a majority of the bore 122. For example, each bore 122 can be considered to have a length between its outboard end 130 and its optical interface surface 132, and the first slot 136 may extend along at least 50%, at least 75%, at least 90%, etc. of that length. Likewise, each second slot 138 is formed between the bore 122 of the projecting boss 120 and the second surface 108 so as to be opposite the first slot 136, and extends from the outboard end 130 of the projecting boss 120 and along a majority of the bore 122. The relatively long length of the first slot 136 and the second slot 138 may allow etching solution to better reach (and thereby etch away) all laser-damaged material intended to define the bore 122.

Still referring to FIGS. 3 and 4, the second side 104 of the waveguide substrate 100 is configured so that relief cavities 140 are provided adjacent each projecting boss 120. The relief cavities 140 enable the waveguide substrate 100 to accommodate portions of a connector body (not shown in FIGS. 3 and 4) to allow a connector ferrule to be fully advanced in one of the bores 122, as will be described in greater detail below. The forward-facing surfaces 124 of the second side 104 define bottom portions of the relief cavities 140. One side of each relief cavity 140 is bound by one of the projecting bosses 120, while another side of each relief cavity 140 is bound by an arm 142 (also referred to as a wedge or spacer) that extends outward from the forward-facing surface 124. The embodiment shown includes an arm 142 between each projecting boss 120. More specifically, the embodiment shown includes a first type of arm 142A between the projecting bosses 120 associated with one of the subsets of the waveguides 110, and a second type of arm 142B between the projecting bosses 120 associated with waveguides 110 of adjacent subsets. Only the first type of arm 142A includes the alignment feature 118, but in other embodiments the second type of arm 142B may alternatively or additionally include alignment features. The alignment features 118 are similar to the alignment features 116 (FIGS. 1 and 2); their purpose and various alternative embodiments are disclosed in the '219 publication. Embodiments are also possible that do not include an arm between some or all adjacent projecting bosses 120, or that only include one type of arm 142.

Figure 5:
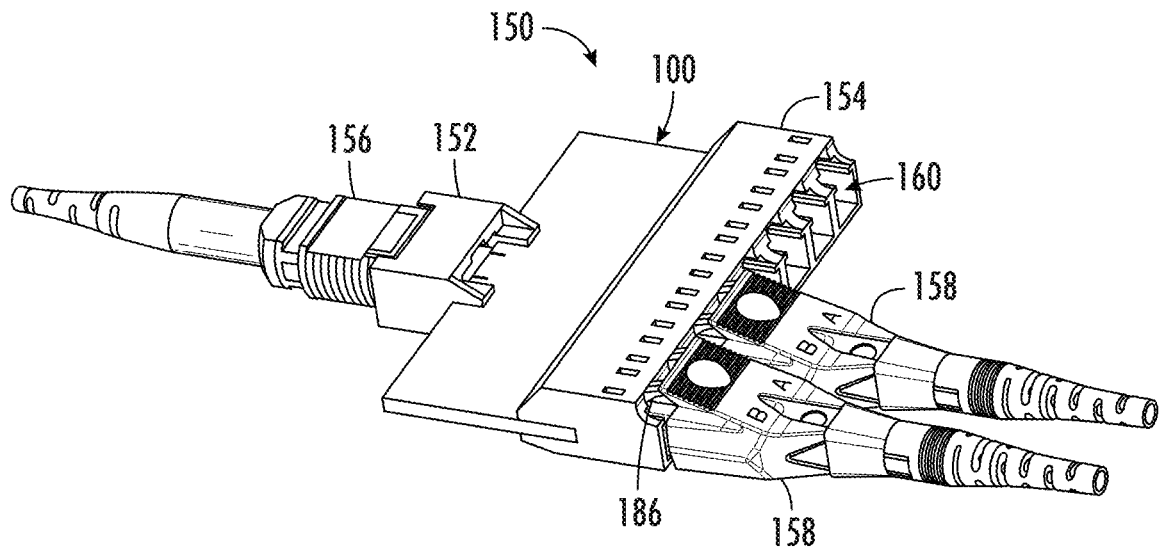
FIG. 5 is a perspective view of one example of an optical waveguide assembly that includes a waveguide substrate according to this disclosure, with various optical connectors shown as being coupled to the optical waveguide assembly.

FIG. 5 illustrates the waveguide substrate 100 as part of an optical waveguide assembly 150 that includes: the waveguide substrate 100, a housing 152 coupled to the first side 102 of the waveguide substrate 100, and a housing 154 coupled to the second side 104 of the waveguide substrate 100. Various optical connectors are shown as being coupled to the optical waveguide assembly 150. In particular, an MPO connector 156 is coupled to the housing 152, which helps align optical fibers (not shown) supported by the MPO connector 156 with the waveguides 110 (FIG. 2) at the first side 102 of the waveguide substrate 100. Such an example is also disclosed in the '219 publication, and the same principles/variations from the '219 publication may equally apply to the present disclosure.

Two duplex LC connectors 158 ("connectors 158") are shown as being coupled to the housing 154, which is configured to accept a total of four of such connectors 158 (for a total of eight LC fiber optic connections) in respective connector cavities 160 defined by the housing 154. In essence, the housing 154 has a ganged configuration, functioning like various individual housings that have a respective connector cavity for receiving a connector 158. Indeed, individual housings (not shown) for each connector 158 that interfaces with the second side 104 of the waveguide substrate 100 may be provided in alternative embodiments. For example, the individual housings may correspond to simplex adapters or duplex adapters, depending on the configuration of the connector with which the second side 104 is designed to interface. Configurations involving housings with a smaller ganged arrangement (e.g., only configured to accept two connectors 158) are also possible. The housing 154 helps align optical fibers (not shown) supported by the connectors 158 with the waveguides 110 (FIG. 2) at the second side 104 of the waveguide substrate 100, as will now be described in further detail.

Figure 6:
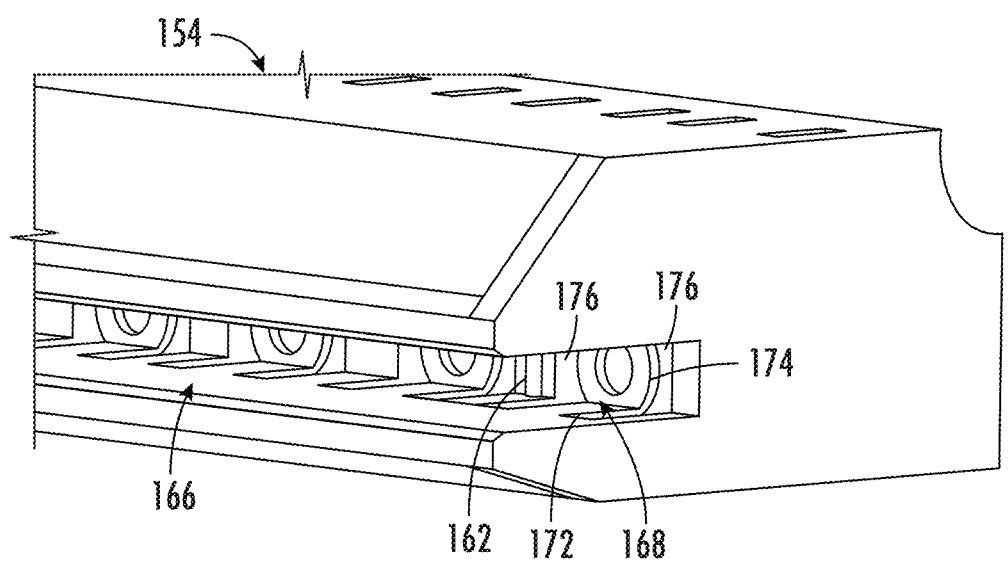
FIG. 6 is a rear perspective view of a housing that is part of the optical waveguide assembly shown in FIG. 5.

For example, FIG. 6 illustrates a back side 164 of the housing 154 that interfaces with the waveguide substrate 100 (not shown in FIG. 6). The back side 164 of the housing 154 includes a mounting slot 166 that receives the waveguide substrate 100. Alignment features 162 within the mounting slot are configured to cooperate with the alignment features 118 so that the waveguide substrate 100 and the housing 154 are properly positioned relative to each other when coupled together. The positioning results in the projecting bosses 120 (FIGS. 1-4) being aligned with barrel-like segments 168 defined by the housing 154 between the mounting slot 166 and the connector cavities 160. Each barrel-like segment 168 includes a top extension 170, a bottom extension 172, and an annular element 174 ("ring 174") at ends of the top and bottom extensions 170, 172. The positioning also results in the relief cavities 140 (FIGS. 3 and 4) being aligned with openings 176 that are in the mounting slot 166 and adjacent the barrel-like segments 168.

Figure 7:
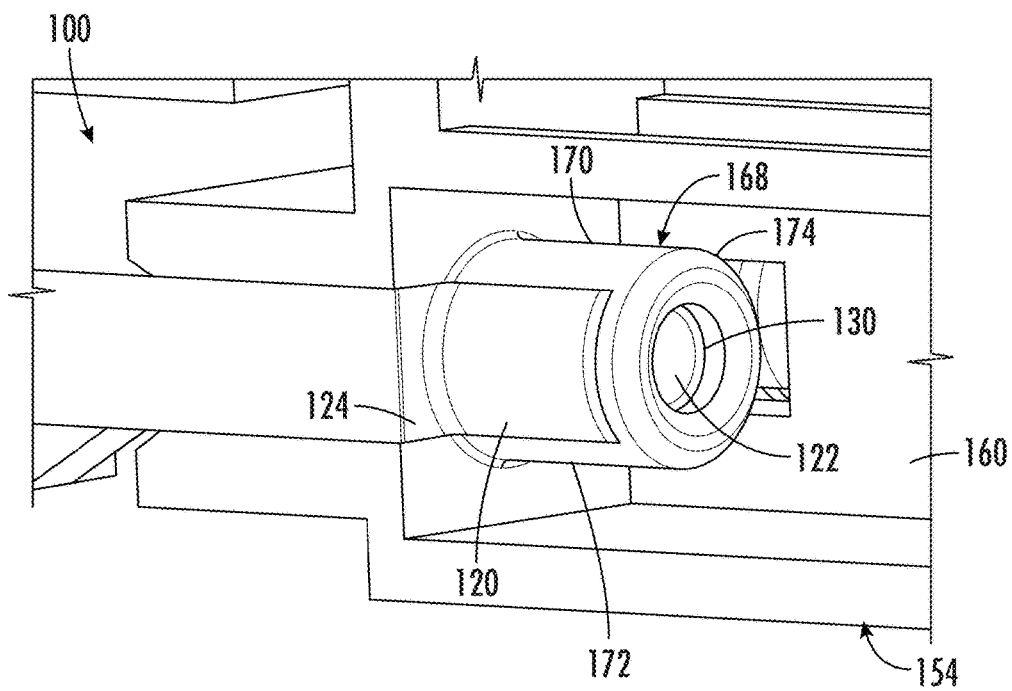
FIG. 7 is a cross-sectional perspective view of a portion of the optical waveguide assembly of FIG. 5, illustrating how the housing interfaces with the waveguide substrate.

FIG. 7 illustrates a representative projecting boss 120 and barrel-like segment 168 when the waveguide substrate 100 and housing 154 are coupled together. The projecting boss 120 is received in the barrel-like segment 168, with the top and bottom extensions 170, 172 resting on opposite sides of the projecting boss 120 and the ring 174 resting against the outboard end 130. The bore 122 in the projecting boss 120 communicates with (i.e., has an open passageway to/from) the connector cavity 160 through the ring 174, which provides a lead-in to the bore 122. The relief cavities 140 adjacent the projecting boss 120 also communicate with the connector cavity 160 due to the openings 176 in the mounting slot 166.

Figure 8:
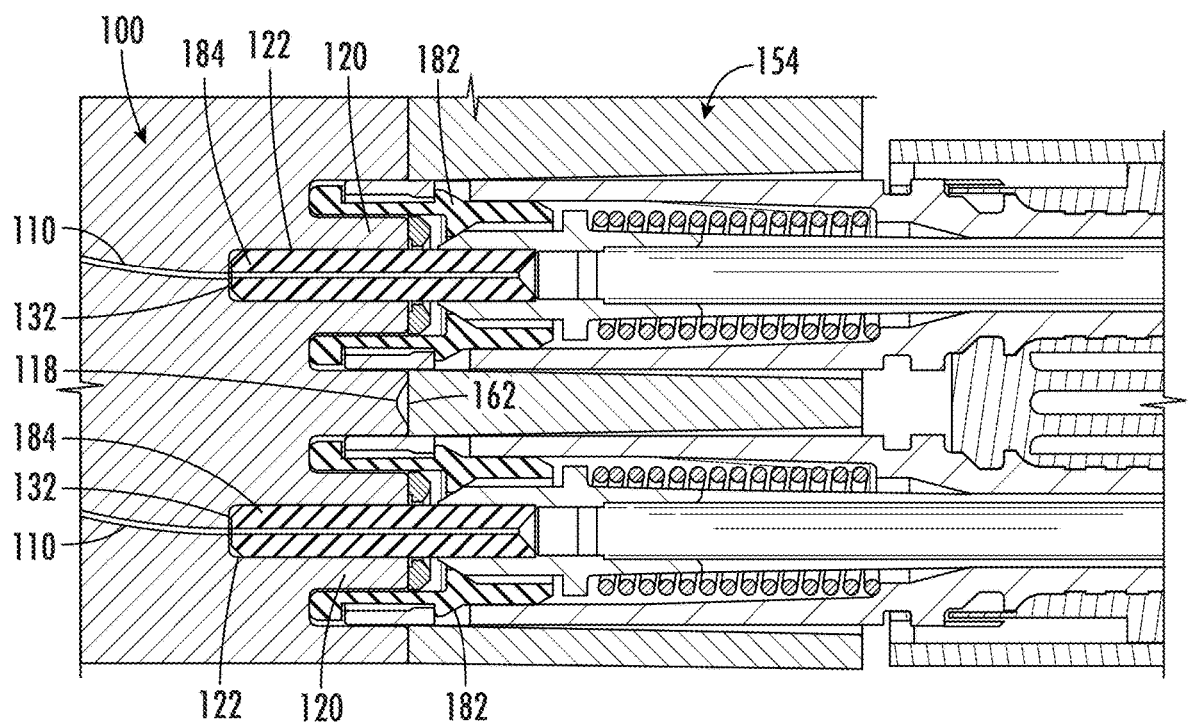
FIG. 8 is a cross-sectional top view of a duplex LC fiber optic connector being coupled to the optical waveguide assembly of FIG. 5.

FIG. 8 illustrates a representative connector 158 interfacing with the optical waveguide assembly 150. The connector 158 includes two connector sub-assemblies 180, each of which may themselves be considered as a connector). The connector sub-assemblies 180 include a connector body 182 and a ferrule 184 that extends from the connector body 182. The connector body 182 is configured to mechanically couple the connector sub-assembly 180 with the housing 154 by way of latching features (e.g., latch arms 186; see FIG. 5). To this end, the housing 154 defines corresponding latching features (not shown; inside connector cavities 160) in the same manner as conventional fiber optic adapters. The ferrule 184 supports the end of an optical fiber (not shown in FIG. 8 to simplify the drawings), as is well-known.

When inserting the connector 158/connector sub-assembly 180 into a connector cavity 160 of the housing 154, the ring 174 provides coarse alignment for the ferrule 184, leading it to the bore 122 of the projecting boss 120. Further insertion of the connector 158 is possible because the relief cavities 140 accommodate portions of the connector body 182, as shown in FIG. 8. The bores 122 are longer than the projecting bosses 120 and relief cavities 140 to accommodate the extension of the ferrule 184 beyond the connector body 182. Thus, the connector 158 can be inserted until the ferrule 184 reaches the optical interface surface 132, allowing the optical fiber that is carried by the ferrule 184 to optically couple to the waveguide 110 that extends from the optical interface surface 132. The projecting boss 120, which may be formed with precision through the laser damage-and-etch process or otherwise, provides fine alignment of the ferrule 184 (and, therefore, the optical fiber) for such optical coupling.

When coupled together, the housing 154 and the second side 104 of the waveguide substrate 100 may define an interface that complies with intermatability standards or specifications for the connectors 158. Thus, in the embodiment shown, the housing 154 and the second side 104 of the waveguide substrate 100 may cooperate to define a receptacle/adapter according to duplex configurations in LC intermatability standards (e.g., IEC 61754-20-2: 2012 or TIA/EIA 604-10-B: 2008). In alternative embodiments, the second side 104 of the waveguide substrate 100 and the housing 154 may be designed to accept different types of connectors, such as CS connectors, SN connectors, or MDC connectors according to the QSFP-DD Multi-Source Agreement (MSA) Hardware Specification, Rev. 5.1, 2020 (and the relevant documents cross-referenced therein).

Figure 9:
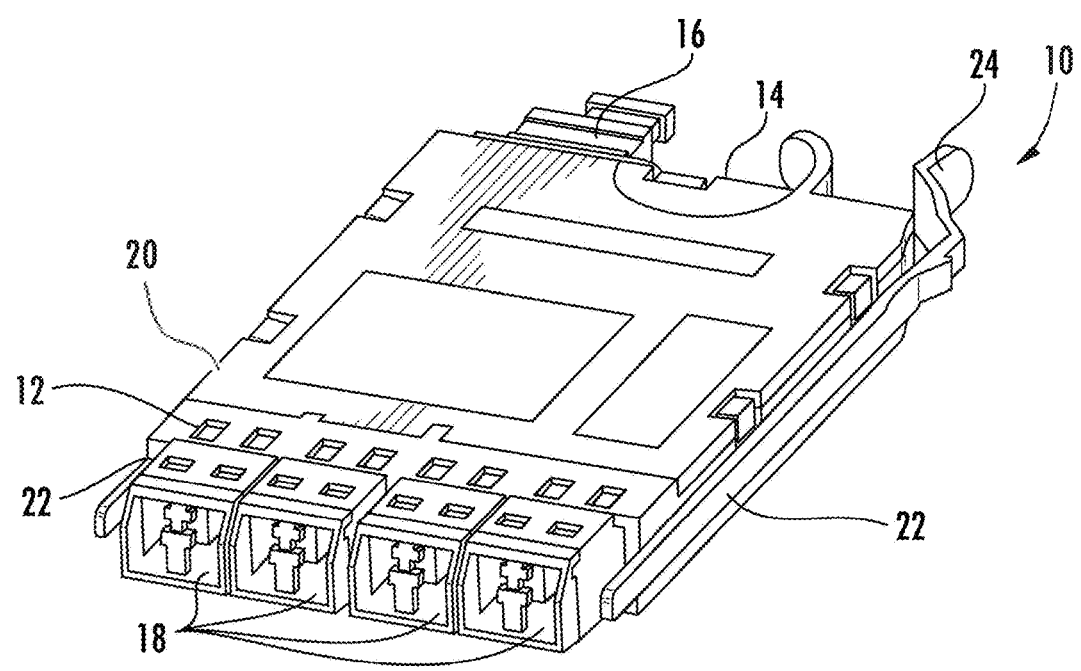
FIG. 9 is a perspective view of an example fiber optic module.

Referring to both FIGS. 5 and 9, and according to this disclosure, the fiber optic module 10 may include the optical waveguide assembly 150 rather than the harness referred to in the background section above. In other words, the optical waveguide assembly 150 may be positioned within the interior of the body 12 of the fiber optic module 10 and used to route optical signals between opposite sides of the body 12. For example, a cover 20 may be removed from a remainder of the body 12 to allow such placement. The adapters 18 may be defined by non-ganged versions of the housing 154 and the second side 104 of the waveguide substrate 100. Although multiple adapters 18 are shown, it will be appreciated that a common, ganged arrangement using the housing 154 is also possible, with the housing 154 and second side 104 of the waveguide substrate 100 defining multiple, duplex connection interfaces.

Similarly, the adapter 16 may be defined by the housing 152 alone or in combination with the first side 102 of the waveguide substrate 100. Thus, the housing 152 alone or in combination with the first side 102 of the waveguide substrate 100 may define a receptacle/adapter according to MPO intermatability standards (e.g., according to standard IEC 61754-7-2: 2019 or TIA/EIA 604-5-F: 2019). The shape of the waveguide substrate 100 and routing/path of the waveguides 110 can be designed/configured based on the design of the fiber optic module 10, and particularly the relative positions of the adapters 16, 18. The configuration does not change the manner in which the optical waveguide assembly 150 functions to route optical signals in the manner discussed above. The fiber optic module 10 may include additional features such as side rails 22 on the body 12, with one of the rails 22 being integral with a rear latch 24.

Those skilled in the art will appreciate that other modifications and variations can be made without departing from the spirit or scope of the invention. For example, although only FIGS. 2 and 4 only illustrate a single waveguide 110 extending from each optical interface surface 132, other embodiments may include multiple waveguides 110 extending from each optical interface surface 132. This may be the case if the optical waveguide assembly 150 is configured to interface with optical connectors (not shown) having ferrules that terminate multi-core optical fibers. Embodiments are also possible where the first side 102 of the waveguide substrate 100 includes at least one projecting boss 120 (and the associated bore 122) instead of, or in addition to, an interface for an MPO connector. One specific example is the first side 102 including a projecting boss 120 and bore 122 for receiving a ferrule (not shown) that terminates a multi-core optical fiber having fiber cores arranged in a 1×4 array. The waveguides 110 may then be configured to route optical signals from this array, which represents a larger connection group according to this disclosure, to four simplex connections or two smaller connection groups that each provide a duplex connection on the second side 104 of the waveguide substrate 100. Thus, in such embodiments, the optical waveguide assembly 150 can function as a multi-core optical fiber fanout devices.

Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A waveguide substrate configured to interface with at least one optical connector that includes a ferrule extending from a connector body, the waveguide substrate comprising:
    a first surface and a second surface opposite the first surface;
    a communication side defined between the first surface and the second surface, the communication side having at least one projecting boss that at least partially defines a bore for receiving the ferrule of the at least one optical connector, wherein each projecting boss of the at least one projecting boss includes an outboard end from which the bore extends into the waveguide substrate, and wherein the bore terminates within the waveguide substrate at an optical interface surface of the waveguide substrate;
    at least one waveguide within the waveguide substrate extending from the optical interface surface; and
    a first slot formed in each projecting boss of the at least one projecting boss, wherein the first slot is formed between the bore of the projecting boss and the first surface, and wherein the first slot extends from the outboard end of the projecting boss and along a majority of the bore.

2. The waveguide substrate of claim 1, further comprising:
    a second slot formed in each projecting boss of the at least one projecting boss, wherein the second slot is formed between the bore of the projecting boss and the second surface so as to be opposite the first slot, and wherein the second slot extends from the outboard end of the projecting boss and along a majority of the bore.

3. The waveguide substrate of claim 1, wherein for each projecting boss of the at least one projecting boss, the communication side of the waveguide substrate further includes relief cavities adjacent the projecting boss for receiving a portion of the connector body.

4. The waveguide substrate of claim 3, wherein for each projecting boss of the at least one projecting boss, the bore is longer than the relief cavities that are adjacent to the projecting boss.

5. The waveguide substrate of claim 4, wherein for each projecting boss of the at least one projecting boss, the first slot extends further into the waveguide substrate than the relief cavities.

6. The waveguide substrate of claim 1, wherein for each projecting boss of the at least one projecting boss, the bore is longer than the projecting boss so as to extend into the waveguide substrate beyond the projecting boss.

7. The waveguide substrate of claim 1, wherein for each projecting boss of the at least one projecting boss, the first slot is longer than the projecting boss so as to extend into the waveguide substrate beyond the projecting boss.

8. An optical waveguide assembly configured to interface with at least one optical connector, the optical waveguide assembly comprising:
    a waveguide substrate including:
        a first surface and a second surface opposite the first surface;
        a communication side defined between the first surface and the second surface, the communication side having at least one projecting boss and relief cavities adjacent each projecting boss of the at least one projecting boss, wherein each projecting boss of the at least one projecting boss at least partially defines a respective bore and comprises an outboard end from which the respective bore extends into the waveguide substrate, and wherein the respective bore terminates within the waveguide substrate at a respective optical interface surface of the waveguide substrate;
        at least one waveguide within the waveguide substrate extending from the respective optical interface surface; and
        a first slot formed in each projecting boss of the at least one projecting boss, wherein the first slot is formed between the respective bore of the projecting boss and the first surface, and wherein the first slot extends from the outboard end of the projecting boss and along a majority of the respective bore; and
    at least one housing coupled to the communication side of the waveguide substrate, wherein each housing of the at least one the housing comprises at least one connector cavity for receiving the at least one optical connector, and wherein each of the relief cavities in the communication side of the waveguide substrate and each projecting boss of the at least one projecting boss communicate with the at least one connector cavity.

9. The optical waveguide assembly of claim 8, wherein for each projecting boss of the at least one projecting boss, the respective bore is longer than the relief cavities that are adjacent to the projecting boss.

10. The optical waveguide assembly of claim 8, wherein for each projecting boss of the at least one projecting boss, the first slot extends further into the waveguide substrate than the relief cavities.

11. The optical waveguide assembly of claim 8, wherein for each projecting boss of the at least one projecting boss, the respective bore is longer than the projecting boss so as to extend into the waveguide substrate beyond the projecting boss.

12. The optical waveguide assembly of any of claim 8, wherein for each projecting boss of the at least one projecting boss, the first slot is longer than the projecting boss so as to extend into the waveguide substrate beyond the projecting boss.

13. The optical waveguide assembly of claim 8, wherein the at least one projecting boss comprises a plurality of the projecting bosses such that there are a plurality of the respective bores and a plurality of the respective optical interface surfaces.

14. The optical waveguide assembly of claim 13, wherein for each projecting boss of the plurality of projecting bosses, the at least one waveguide extending from the respective optical interface surface consists of a single waveguide.

15. The optical waveguide assembly of claim 13, wherein the at least one housing comprises a plurality of housings.

16. The optical waveguide assembly of claim 13, wherein the communication side of the substrate and the at least one housing define a plurality of simplex or duplex LC interfaces according to IEC 61754-20-2: 2012 or TIA/EIA 604-10-B: 2008.

17. The optical waveguide assembly of claim 13, wherein:
- the communication side of the waveguide substrate defines an output side of the waveguide substrate;
- the waveguide substrate further comprises an input side opposite the output side;
- each waveguide of the plurality of waveguides extends between the input side and the output side; and
- any two adjacent waveguides of the plurality of waveguides at the input side have a pitch that is larger than a pitch of any two adjacent waveguides of the plurality of waveguides at the output side.

18. A fiber optic assembly for routing optical signals from a plurality of first optical connectors to at least one second optical connector, the fiber optic assembly comprising:
- a body defining an interior;
- a waveguide substrate positioned within the interior of the body, the waveguide substrate including:
  - a first surface and a second surface opposite the first surface;
  - a communication side defined between the first surface and the second surface, the communication side including a plurality of projecting bosses and relief cavities adjacent each projecting boss of the plurality of projecting bosses, wherein each projecting boss of the plurality of projecting bosses at least partially defines a respective bore and comprises an outboard end from which the respective bore extends into the waveguide substrate, and wherein the respective bore terminates within the waveguide substrate at a respective optical interface surface of the waveguide substrate;
  - a plurality of waveguides within the waveguide substrate each extending from one of the respective optical interface surfaces; and
  - a first slot formed in each projecting boss of the plurality of projecting bosses, wherein the first slot is formed between the respective bore of the projecting boss and the first surface, and wherein the first slot extends from the outboard end of the projecting boss and along a majority of the respective bore; and
- at least one housing coupled to the communication side of the waveguide substrate, wherein each housing of the at least one the housing comprises at least one connector cavity for receiving at least one first optical connector of the plurality of first optical connectors, and wherein each of the strain relief cavities in the communication side of the waveguide substrate and each projecting boss of the plurality of projecting bosses communicate with a respective connector cavity of the at least one connector cavity.

19. The fiber optic assembly of claim 18, wherein the at least one housing comprises a plurality of housings.

20. The fiber optic assembly of claim 18, wherein the communication side of the waveguide substrate and the at least one housing define a plurality of simplex or duplex LC interfaces according to IEC 61754-20-2: 2012 or TIA/EIA 604-10-B: 2008.

* * * * *